(12) United States Patent
Cox et al.

(10) Patent No.: US 7,139,454 B2
(45) Date of Patent: Nov. 21, 2006

(54) METHODS FOR SIGNAL TRANSMISSION IN OPTICAL FIBER

(75) Inventors: James A. Cox, New Brighton, MN (US); Bo Su Chen, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/054,682

(22) Filed: Feb. 9, 2005

(65) Prior Publication Data
US 2005/0201680 A1 Sep. 15, 2005

Related U.S. Application Data

(62) Division of application No. 10/610,256, filed on Jun. 30, 2003, now Pat. No. 6,961,489.

(51) Int. Cl.
G02B 6/32 (2006.01)
(52) U.S. Cl. .............. 385/33; 385/31; 385/39; 385/147; 359/738
(58) Field of Classification Search ............. 385/33
See application file for complete search history.

(56) References Cited

U.S. PATENT DOCUMENTS

| | | | |
|---|---|---|---|
| 3,271,631 A | 9/1966 | Marinace | |
| 3,419,321 A * | 12/1968 | Barber et al. | 219/121.7 |
| 3,848,970 A | 11/1974 | Goodell | |
| 3,936,742 A | 2/1976 | Krause | |
| 3,980,391 A * | 9/1976 | Stewart | 385/33 |
| 4,128,302 A | 12/1978 | Di Vita | |
| 4,317,085 A | 2/1982 | Brunham et al. | |
| 4,408,871 A | 10/1983 | Kojima | |
| 4,466,694 A | 8/1984 | MacDonald | |
| 4,483,585 A | 11/1984 | Takami | |
| 4,490,618 A | 12/1984 | Cielo | |
| 4,660,207 A | 4/1987 | Svilans | |
| 4,675,058 A | 6/1987 | Plaster | |
| 4,678,269 A | 7/1987 | Pace | |
| 4,681,414 A | 7/1987 | Hershet | |
| 4,729,655 A * | 3/1988 | Boggy et al. | 356/121 |
| 4,755,036 A | 7/1988 | Suzuk et al. | |
| 4,765,703 A | 8/1988 | Suzuki et al. | |
| 4,784,722 A | 11/1988 | Liau et al. | |
| 4,816,912 A | 3/1989 | Suzuki et al. | |
| 4,818,058 A | 4/1989 | Bonanni | |

(Continued)

FOREIGN PATENT DOCUMENTS

DE 4240706 A1 6/1994

(Continued)

OTHER PUBLICATIONS

Banwell et al., "VCSE Laser Transmitters for Parallel Data Links", *IEEE Journal of Quantum Electronics*, vol. 29, No. 2, Feb. 1993, pp. 635-644.

(Continued)

*Primary Examiner*—Kaveh Kianni
*Assistant Examiner*—Ryan Lepisto
(74) *Attorney, Agent, or Firm*—Workman Nydegger

(57) ABSTRACT

This disclosure concerns methods for transmitting a signal in an optical system. In one example, the method begins when an optical signal is generated. Then, the optical signal is manipulated such that the optical signal defines a substantially annular intensity profile, where power of the optical signal varies in the intensity profile. Finally, the optical signal is launched into an input face of an optical fiber such that a predetermined part of the intensity profile of the optical signal is located proximate an optical axis associated with the optical fiber.

12 Claims, 8 Drawing Sheets

U.S. PATENT DOCUMENTS

| | | | |
|---|---|---|---|
| 4,829,537 A | 5/1989 | Baer | |
| 4,834,484 A * | 5/1989 | Gorman et al. | 385/26 |
| 4,842,390 A | 6/1989 | Sottini et al. | |
| 4,885,592 A | 12/1989 | Kofol et al. | |
| 4,894,785 A | 1/1990 | Fernandes | |
| 4,901,327 A | 2/1990 | Bradley | |
| 4,935,029 A | 6/1990 | Matsutani et al. | |
| 4,943,128 A | 7/1990 | Takada et al. | |
| 4,943,970 A | 7/1990 | Bradley | |
| 4,956,844 A | 9/1990 | Goodhue et al. | |
| 4,961,622 A | 10/1990 | Gorman et al. | |
| 4,976,727 A | 12/1990 | Matsutani et al. | |
| 4,981,338 A * | 1/1991 | Bobb et al. | 385/12 |
| 4,988,863 A * | 1/1991 | Bobb et al. | 250/227.25 |
| 5,001,323 A | 3/1991 | Matsutani et al. | |
| 5,029,101 A | 7/1991 | Fernandes | |
| 5,029,973 A | 7/1991 | Rink | |
| 5,031,187 A | 7/1991 | Orenstein et al. | |
| 5,047,076 A | 9/1991 | Cognolato et al. | |
| 5,052,016 A | 9/1991 | Mahbobzadeh | |
| 5,052,772 A | 10/1991 | Okamoto et al. | |
| 5,056,098 A | 10/1991 | Anthony et al. | |
| 5,062,115 A | 10/1991 | Thornton | |
| 5,068,869 A | 11/1991 | Wang et al. | |
| 5,079,774 A | 1/1992 | Mendez et al. | |
| 5,115,442 A | 5/1992 | Lee et al. | |
| 5,117,469 A | 5/1992 | Cheung et al. | |
| 5,140,605 A | 8/1992 | Paoli et al. | |
| 5,157,537 A | 10/1992 | Rosenblatt et al. | |
| 5,158,908 A | 10/1992 | Blonder et al. | |
| 5,170,406 A | 12/1992 | Tidwell | |
| 5,212,706 A | 5/1993 | Jain | |
| 5,216,263 A | 6/1993 | Paoli | |
| 5,216,680 A | 6/1993 | Magnusson et al. | |
| 5,237,581 A | 8/1993 | Asada et al. | |
| 5,245,622 A | 9/1993 | Jewell et al. | |
| 5,253,037 A * | 10/1993 | Klainer et al. | 356/133 |
| 5,258,990 A | 11/1993 | Olbright et al. | |
| 5,262,360 A | 11/1993 | Holonyak, Jr. et al. | |
| 5,285,466 A | 2/1994 | Tabatabaie | |
| 5,293,392 A | 3/1994 | Shieh et al. | |
| 5,312,398 A | 5/1994 | Hobart et al. | |
| 5,317,170 A | 5/1994 | Paoli | |
| 5,317,587 A | 5/1994 | Ackley et al. | |
| 5,325,386 A | 6/1994 | Jewell et al. | |
| 5,331,654 A | 7/1994 | Jewell et al. | |
| 5,337,074 A | 8/1994 | Thornton | |
| 5,337,183 A | 8/1994 | Rosenblatt et al. | |
| 5,349,599 A | 9/1994 | Larkins | |
| 5,351,256 A | 9/1994 | Schneider et al. | |
| 5,354,323 A | 10/1994 | Whitebook | |
| 5,359,447 A | 10/1994 | Hahn et al. | |
| 5,359,618 A | 10/1994 | Lebby et al. | |
| 5,363,397 A | 11/1994 | Collins et al. | |
| 5,373,520 A | 12/1994 | Shoji et al. | |
| 5,373,522 A | 12/1994 | Holonyak, Jr. et al. | |
| 5,376,580 A | 12/1994 | Kish et al. | |
| 5,386,426 A | 1/1995 | Stephens | |
| 5,390,209 A | 2/1995 | Vakhshoori | |
| 5,396,508 A | 3/1995 | Bour et al. | |
| 5,400,145 A | 3/1995 | Suita et al. | |
| 5,402,258 A | 3/1995 | Murakami et al. | |
| 5,404,373 A | 4/1995 | Cheng | |
| 5,404,869 A | 4/1995 | Parkyn, Jr. et al. | |
| 5,412,678 A | 5/1995 | Treat et al. | |
| 5,412,680 A | 5/1995 | Swirhun et al. | |
| 5,414,600 A | 5/1995 | Strobl et al. | |
| 5,415,652 A | 5/1995 | Mueller et al. | |
| 5,416,044 A | 5/1995 | Chino et al. | |
| 5,428,634 A | 6/1995 | Bryan et al. | |
| 5,430,634 A | 7/1995 | Baker et al. | |
| 5,438,584 A | 8/1995 | Paoli et al. | |
| 5,446,754 A | 8/1995 | Jewell et al. | |
| 5,458,594 A | 10/1995 | Mueller et al. | |
| 5,465,263 A | 11/1995 | Bour et al. | |
| 5,467,104 A | 11/1995 | Furness, III et al. | |
| 5,470,314 A | 11/1995 | Walimsky | |
| 5,475,701 A | 12/1995 | Hibbs-Brenner | |
| 5,485,225 A * | 1/1996 | Deter et al. | 348/804 |
| 5,491,344 A | 2/1996 | Kenny et al. | |
| 5,493,577 A | 2/1996 | Choquette et al. | |
| 5,495,576 A | 2/1996 | Ritchey | |
| 5,497,390 A | 3/1996 | Tanaka et al. | |
| 5,509,095 A | 4/1996 | Baker et al. | |
| 5,513,202 A | 4/1996 | Kobayashi et al. | |
| 5,530,709 A | 6/1996 | Waarts et al. | |
| 5,530,715 A | 6/1996 | Shieh et al. | |
| 5,555,255 A | 9/1996 | Kock et al. | |
| 5,557,626 A | 9/1996 | Grodinski et al. | |
| 5,561,683 A | 10/1996 | Kwon | |
| 5,567,980 A | 10/1996 | Holonyak, Jr. et al. | |
| 5,568,498 A | 10/1996 | Nilsson | |
| 5,568,499 A | 10/1996 | Lear | |
| 5,574,738 A | 11/1996 | Morgan | |
| 5,577,492 A | 11/1996 | Parkyn, Jr. et al. | |
| 5,581,571 A | 12/1996 | Holonyak, Jr. et al. | |
| 5,586,131 A | 12/1996 | Ono et al. | |
| 5,590,145 A | 12/1996 | Nitta | |
| 5,594,752 A | 1/1997 | Endriz | |
| 5,596,339 A | 1/1997 | Furness, III et al. | |
| 5,598,300 A | 1/1997 | Magnusson et al. | |
| 5,600,126 A | 2/1997 | Appel et al. | |
| 5,606,572 A | 2/1997 | Swirhun et al. | |
| 5,610,712 A * | 3/1997 | Schmitz et al. | 356/335 |
| 5,613,769 A | 3/1997 | Parkyn, Jr. et al. | |
| 5,625,729 A | 4/1997 | Brown | |
| 5,642,376 A | 6/1997 | Olbright et al. | |
| 5,645,462 A | 7/1997 | Banno et al. | |
| 5,646,978 A | 7/1997 | Kem et al. | |
| 5,648,978 A | 7/1997 | Sakata | |
| 5,659,327 A | 8/1997 | Furness, III et al. | |
| 5,676,453 A | 10/1997 | Parkyn, Jr. et al. | |
| 5,677,920 A | 10/1997 | Waarts et al. | |
| 5,679,963 A | 10/1997 | Klem et al. | |
| 5,692,083 A | 11/1997 | Bennett | |
| 5,696,023 A | 12/1997 | Holonyak, Jr. et al. | |
| 5,699,373 A | 12/1997 | Uchida et al. | |
| 5,712,188 A | 1/1998 | Chu et al. | |
| 5,726,805 A | 3/1998 | Kaushik et al. | |
| 5,727,013 A | 3/1998 | Botez et al. | |
| 5,727,014 A | 3/1998 | Wang et al. | |
| 5,773,817 A * | 6/1998 | Kingsley et al. | 250/214.1 |
| 5,774,487 A | 6/1998 | Morgan | |
| 5,777,342 A | 7/1998 | Baer | |
| 5,778,018 A | 7/1998 | Yoshikawa et al. | |
| 5,781,575 A | 7/1998 | Nilsson | |
| 5,784,399 A | 7/1998 | Sun | |
| 5,790,576 A | 8/1998 | Waarts et al. | |
| 5,790,733 A | 8/1998 | Smith et al. | |
| 5,793,783 A | 8/1998 | Endriz | |
| 5,799,543 A | 9/1998 | Nagai et al. | |
| 5,802,092 A | 9/1998 | Endriz | |
| 5,805,624 A | 9/1998 | Yang et al. | |
| 5,806,955 A | 9/1998 | Parkyn, Jr. et al. | |
| 5,818,066 A | 10/1998 | Duboz | |
| 5,828,684 A | 10/1998 | Van de Walle | |
| 5,832,055 A | 11/1998 | Dewaele | |
| 5,836,667 A | 11/1998 | Baker et al. | |
| 5,838,705 A | 11/1998 | Shieh et al. | |
| 5,838,715 A | 11/1998 | Corzine et al. | |
| 5,861,955 A | 1/1999 | Gordon | |
| 5,866,911 A | 2/1999 | Baer | |
| 5,892,784 A | 4/1999 | Tan et al. | |
| 5,892,787 A | 4/1999 | Tan et al. | |

| | | |
|---|---|---|
| 5,896,408 A | 4/1999 | Corzine et al. |
| 5,896,475 A | 4/1999 | Perchak |
| 5,901,166 A | 5/1999 | Nitta et al. |
| 5,903,588 A | 5/1999 | Guenter et al. |
| 5,903,589 A | 5/1999 | Jewell |
| 5,903,590 A | 5/1999 | Hadley et al. |
| 5,908,408 A | 6/1999 | McGary et al. |
| 5,936,266 A | 8/1999 | Holonyak, Jr. et al. |
| 5,936,777 A | 8/1999 | Dempewolf |
| 5,940,422 A | 8/1999 | Johnson |
| 5,952,668 A | 9/1999 | Baer |
| 5,953,362 A | 9/1999 | Pamulapati et al. |
| 5,978,401 A | 11/1999 | Morgan |
| 5,978,408 A | 11/1999 | Thornton |
| 5,993,466 A | 11/1999 | Yoon |
| 5,993,467 A | 11/1999 | Yoon |
| 5,995,531 A | 11/1999 | Gaw et al. |
| 5,998,215 A | 12/1999 | Prather et al. |
| 6,002,705 A | 12/1999 | Thornton |
| 6,008,675 A | 12/1999 | Handa |
| 6,008,781 A | 12/1999 | Furness, III et al. |
| 6,014,395 A | 1/2000 | Jewell |
| 6,043,104 A | 3/2000 | Uchida et al. |
| 6,046,065 A | 4/2000 | Goldstein et al. |
| 6,052,398 A | 4/2000 | Brillouet et al. |
| 6,055,262 A | 4/2000 | Cox et al. |
| 6,060,743 A | 5/2000 | Sugiyama et al. |
| 6,075,650 A | 6/2000 | Morris et al. |
| 6,078,601 A | 6/2000 | Smith |
| 6,086,263 A | 7/2000 | Selli et al. |
| 6,133,590 A | 10/2000 | Ashley et al. |
| 6,139,517 A | 10/2000 | Macoviak |
| 6,144,682 A | 11/2000 | Sun |
| 6,154,480 A | 11/2000 | Magnusson et al. |
| 6,160,916 A | 12/2000 | Horiuchi |
| 6,185,241 B1 | 2/2001 | Sun |
| 6,186,648 B1 | 2/2001 | Baker et al. |
| 6,191,890 B1 | 2/2001 | Baets et al. |
| 6,208,681 B1 | 3/2001 | Thornton |
| 6,212,312 B1 | 4/2001 | Grann et al. |
| 6,222,864 B1 | 4/2001 | Waarts et al. |
| 6,238,944 B1 | 5/2001 | Floyd |
| 6,253,004 B1 | 6/2001 | Lee et al. |
| 6,254,563 B1 | 7/2001 | Macoviak et al. |
| 6,259,104 B1 | 7/2001 | Baer |
| 6,269,109 B1 | 7/2001 | Jewell |
| 6,297,068 B1 | 10/2001 | Thornton |
| 6,302,596 B1 | 10/2001 | Cohen et al. |
| 6,317,103 B1 | 11/2001 | Furness, III et al. |
| 6,324,326 B1 | 11/2001 | Dejneka et al. |
| 6,339,496 B1 | 1/2002 | Koley et al. |
| 6,349,159 B1 | 2/2002 | Uebbing et al. |
| 6,356,572 B1 | 3/2002 | Tanaka et al. |
| 6,366,338 B1 | 4/2002 | Masubuchi et al. |
| 6,369,403 B1 | 4/2002 | Holonyak, Jr. |
| 6,372,533 B1 | 4/2002 | Jayaraman et al. |
| 6,392,257 B1 | 5/2002 | Ramdani et al. |
| 6,410,213 B1 | 6/2002 | Raguin et al. |
| 6,410,941 B1 | 6/2002 | Taylor et al. |
| 6,411,638 B1 | 6/2002 | Johnson et al. |
| 6,411,835 B1 | 6/2002 | Modell et al. |
| 6,427,066 B1 | 7/2002 | Grube |
| 6,455,879 B1 | 9/2002 | Ashley et al. |
| 6,459,709 B1 | 10/2002 | Lo et al. |
| 6,459,713 B1 | 10/2002 | Jewell |
| 6,462,360 B1 | 10/2002 | Higgins, Jr. et al. |
| 6,472,694 B1 | 10/2002 | Wilson et al. |
| 6,477,285 B1 | 11/2002 | Shanley |
| 6,487,230 B1 | 11/2002 | Boucart et al. |
| 6,487,231 B1 | 11/2002 | Boucart et al. |
| 6,490,311 B1 | 12/2002 | Boucart et al. |
| 6,493,371 B1 | 12/2002 | Boucart et al. |
| 6,493,372 B1 | 12/2002 | Boucart et al. |
| 6,493,373 B1 | 12/2002 | Boucart et al. |
| 6,496,621 B1 * | 12/2002 | Kathman et al. ............. 385/31 |
| 6,498,358 B1 | 12/2002 | Lach et al. |
| 6,501,973 B1 | 12/2002 | Foley et al. |
| 6,515,308 B1 | 2/2003 | Kneissl et al. |
| 6,535,541 B1 | 3/2003 | Boucart et al. |
| 6,536,959 B1 | 3/2003 | Kuhn et al. |
| 6,542,531 B1 | 4/2003 | Sirbu et al. |
| 6,567,435 B1 | 5/2003 | Scott et al. |
| 6,654,183 B1 * | 11/2003 | Coufal et al. ................ 359/717 |
| 6,674,941 B1 * | 1/2004 | Tatum et al. .................. 385/33 |
| 6,688,758 B1 * | 2/2004 | Thibault ...................... 362/368 |
| 6,822,794 B1 * | 11/2004 | Coleman et al. ............ 359/565 |
| 2001/0004414 A1 | 6/2001 | Kuhn et al. |
| 2002/0057873 A1 * | 5/2002 | Wu et al. ...................... 385/33 |
| 2002/0146223 A1 * | 10/2002 | Sorin et al. ................. 385/123 |
| 2002/0154675 A1 | 10/2002 | Deng et al. |
| 2003/0072526 A1 | 4/2003 | Kathman et al. |
| 2003/0120362 A1 * | 6/2003 | Shchegrov ................... 700/37 |
| 2003/0121289 A1 * | 7/2003 | Benda et al. .................. 65/392 |
| 2004/0011975 A1 * | 1/2004 | Nicoli et al. ................. 250/574 |
| 2004/0233388 A1 * | 11/2004 | Artsyukhovich et al. ... 351/216 |

FOREIGN PATENT DOCUMENTS

| | | |
|---|---|---|
| EP | 0288184 | 10/1988 |
| EP | 0288184 A2 | 10/1988 |
| EP | 0776076 A1 | 5/1997 |
| JP | 60123084 | 1/1985 |
| JP | 02054981 | 2/1990 |
| JP | 5299779 | 11/1993 |
| WO | WO 98/57402 | 12/1998 |

OTHER PUBLICATIONS

Bowers et al., "Fused Vertical Cavity Lasers with Oxide Aperture", Final report for MICRO project 96-042, Industrial Sponsor: Hewlett Packard, 4 pages 1996-1997.

Catchmark et al., "High Temperature CW Operation of Vertical Cavity Top Surface-Emitting Lasers", CLEO 1993, p. 138.

Chemla et al., "Nonlinear Optical Properties of Semiconductor Quantum Wells", *Optical Nonlinearities and Instabilities in Semiconductors*, Academic Press, Inc., Copyright 1988, pp. 83-120.

Choe, et al., "Lateral oxidation of AlAs layers at elevated water vapour pressure using a closed-chamber system," Letter to the Editor, Semiconductor Science Technology, 15, pp. L35-L38, Aug. 2000.

Choa et al., "High-Speed Modulation of Vertical-Cavity Surface-Emitting Lasers", *IEEE Photonics Technology Letter*, vol. 3, No. 8, Aug. 1991, pp. 697-699.

Choquette et al., "High Single Mode Operation from Hybrid Ion Implanted/Selectively Oxidized VCSELs", 200 IEE 17th International Semiconductor Laser Conference, Monterey, CA pp. 59-60.

Choquette et al., "Lithographically-Defined Gain Apertures Within Selectively Oxidized VCSELs", paper CtuL6, Conference on Lasers and Electro-Optics, San Francisco, California (2000).

Choquette, et al., "VCSELs in information systems: 10Gbps$^{-1}$ oxide VCSELs for data communication", Optics In Information Systems, vol. 12, No. 1 p. 5, SPIE International Technical Group Newsletter, Apr. 2001.

Chua, et al., "Low-Threshold 1.57-μm VC-SEL's Using Strain-Compensated Quantum Wells and Oxide/Metal Backmirror," IEEE Photonics Technology Letters, vol. 7, No. 5, pp. 444-446, May 1995.

Chua, et al., "Planar Laterally Oxidized Vertical-Cavity Lasers for Low-Threshold High-Density Top-Surface-Emitting Arrays," IEEE Photonics Technology Letters, vol. 9, No. 8 pp. 1060-1062, Aug. 1997.

Cox, J.A., et al., "Guided Mode Grating Resonant Filters for VCSEL Applications", *Proceedings of the SPIE*, The International Society for Optical Engineering, Diffractive and Holographic Device Technologies and Applications V, San Jose, California, Jan. 28-29, 1998, vol. 3291, pp. 70-71.

Farrier, Robert G., "Parametric control for wafer fabrication: New CIM techniques for data analysis," Solid State Technology, pp. 99-105, Sep. 1997.

Fushimi, et al., "Degradation Mechanism in Carbon-doped GaAs Minority-carrier Injection Devices," 34th Annual IRPS Proceedings, Dallas, TX., Apr. 29-May 2, 1996, 8 pages.

G.G. Ortiz, et al., "Monolithic Integration of In0.2 GA0.8 As Vertical Cavity Surface-Emitting Lasers with Resonance-Enhanced Quantum Well Photodetectors", *Electronics Letters*, vol. 32, No. 13, Jun. 20, 1996, pp. 1205-1207.

G. Shtengel et al., "High-Speed Vertical-Cavity Surface-Emitting Lasers", *Photon. Tech. Lett.*, vol. 5, No. 12, pp. 1359-1361 (Dec. 1993).

Geib, et al., "Comparison of Fabrication Approaches for Selectively Oxidized VCSEL Arrays," Proceedings of SPIE, vol. 3946, pp. 36-40, 2000.

Graf, Rudolph, *Modern Dictionary of Electronics*, 6th ed., Indiana: Howard W. Sams & Company, 1984, p. 694.

Guenter et al., "Reliability of Proton-Implanted VCSELs for Data Communications", Invited paper, SPIE, vol. 2683, OE LASE 96; Photonics West: Fabrication, Testing and Reliability of Semiconductor Lasers, (SPIE, Bellingham, WA 1996).

Guenter et al., "Commercialization of Honeywell's VCSEL technology: further developments," Prodeedings of the SPIE, vol. 4286, GSPIE 2000, 14 pages.

Hadley et al, "High-Power Single Mode Operation from Hybrid Ion Implanted/Selectively Oxidized VCSELs", 13th Annual Meeting IEEE Lasers and Electro-Optics Society 2000 Annual Meeting (LEOS 2000), Rio Grande, Puerto Rico, pp. 804-805.

Hawthorne, et al., "Reliability Study of 850nm VCSELs for Data Communications," IEEE, pp. 1-11, May 1996.

Herrick, et al., "Highly reliable oxide VCSELs manufactured at HP/Agilent Technologies," Invited Paper, Proceedings of SPIE vol. 3946, p. 14-19, 2000.

Hibbs-Brenner et al., "Performance, Uniformity and Yield of 850nm VCSELs Deposited by MOVPE", *IEEE Phot. Tech. Lett.*, vol. 8, No. 1, pp. 7-9, Jan. 1996.

Hideaki Saito, et al., "Controlling polarization of quantum-dot surface-emitting lasers by using structurally anisotropic self-assembled quantum dots," American Institute of Physics, Appl, Phys. Lett. 71 (5), pp. 590-592, Aug. 4, 1997.

Hornak et al., "Low Temperature (10K-300K) Characterization of MOVPE-Grown Vertical-Cavity Surface-Emitting Lasers", *Photon. Tech. Lett.*, vol. 7, No. 10, pp. 1110-1112, Oct. 1995.

Huffaker et al., "Lasing Characteristics of Low Threshold Microactivity Layers Using Half-Wave Spacer Layers and Lateral Index Confinement", *Appl. Phys. Lett.*, vol. 6, No. 14, pp. 1723-1725, Apr. 3, 1995.

Jewell et al., "Surface Emitting Microlasers for Photonic Switching & Intership Connections", *Optical Engineering*, vol. 29, No. 3, pp. 210-214, Mar. 1990.

Jiang et al., "High-Frequency Polarization Self-Modulation in Vertical-Cavity Surface-Emitting Lasers", *Appl. Phys. Letters*, vol. 63, No. 26, Dec. 27, 1993, pp. 2545-2547.

K.L. Lear et al., "Selectively Oxidized Vertical Cavity Surface-Emitting Lasers with 50% Power Converstion Efficiency", *Elec. Lett.*, vol. 31, No. 3 pp. 208-209, Feb. 2, 1995.

Kash, et al., "Recombination in GaAs at the AIAs oxide-GaAs interface," Applied Physics Letters, vol. 67, No. 14, pp. 2022-2024, Oct. 2, 1995.

Kishino et al., "Resonant Cavity-Enhanced (RCE) Photodetectors", *IEEE Journal of Quantum Electronics*, vol. 27, No. 8, pp. 2025-2034.

Koley B., et al., "Dependence of lateral oxidation rate on thickness of AIAs layer of interest as a current aperture in vertical-cavity surface-emitting laser structures", Journal of Applied Physics, vol. 84, No. 1, pp. 600-605, Jul. 1, 1998.

Kuchibhotla et al., "Low-Voltage High Gain Resonant Cavity Avalance Photodiode", *IEEE Photonics Technology Letters*, vol. 3, No. 4, pp. 354-356.

Lai et al., "Design of a Tunable GaAs/AlGaAs Multiple-Quantum-Well Resonant Cavity Photodetector", *IEEE Journal of Quantum Electronics*, vol. 30, No. 1, pp. 108-114.

Lee et al., "Top-Surface Emitting GaAs Four-Quantum-Well Lasers Emitting at 0-85 um", *Electronics Letters*, vol. 24, No. 11, May 24, 1990, pp. 710-711.

Lehman et al., "High Frequency Modulation Characteristics of Hybrid Dielectric/AlGaAs Mirror Singlemode VCSELs", *Electronic Letters*, vol. 31, No. 14, Jul. 20, 1995, pp. 1251-1252.

Maeda, et al., "Enhanced Glide of Dislocations in GaAs Single Crystals by Electron Beam Irradiation," Japanese Journal of Applied Physics, vol. 20, No. 3, pp. L165-L168, Mar. 1981.

Magnusson, "Integration of Guided-Mode Resonance Filters and VCSELs", Electo-Optics Research Center, Department of Electrical Engineering, University of Texas at Arlington, May 6, 1997.

Martinsson et al., "Transverse Mode Selection in Large-Area Oxide-Confined Vertical-Cavity Surface-Emitting Lasers Using a Shallow Surface Relief", *IEEE Photon Technol. Lett.*, 11(12), 1536-1538 (1999).

Miller et al., "Optical Bistability Due to Increasing Absorption", *Optics Letters*, vol. 9, No. 5, May 1984, pp. 162-164.

Min Soo Park and Byung Tae Ahn, "Polarization control of vertical-cavity surface-emitting lasers by eletro-optic birefringence," Applied Physics Letter, vol. 76, No. 7, pp. 813-815, Feb. 14, 2000.

Morgan et al., "200 C, 96-nm Wavelength Range Continuous-Wave Lasing from Unbonded GaAs MOVPE-Grown Vertical Cavity Surface-Emitting Lasers", *IEEE Photonics Technology Letters*, vol. 7, No. 5, May 1995, pp. 441-443.

Morgan et al., "High-Power Coherently Coupled 8x8 Vertical Cavity Surface Emitting Laser Array", *Appl. Phys Letters*, vol. 61, No. 10, Sep. 7, 1992, p. 1160-1162.

Morgan, et al., "Hybrid Dielectric/AlGaAs Mirror Spatially Filtered Vertical Cavity Top-Surface Emitting Laser", *Appl. Phys Letters*, vol. 66, No. 10, Mar. 6, 1995, pp. 1157-1159.

Morgan et al., "Novel Hybrid-DBR Single-Mode Controlled GaAs Top-Emitting VCSEL with Record Low Voltage", 2 pages dated prior to Dec. 29, 2000.

Morgan, et al., "One Watt Vertical Cavity Surface Emitting Laser", *Electron. Lett.*, vol. 29, No. 2, pp. 206-207, Jan. 21, 1993.

Morgan et al., "Producible GaAs-based MOVPE-Grown Vertical-Cavity Top-Surface Emitting Lasers with Record Performance", *Elec. Lett.*, vol. 31, No. 6, pp. 462-464, Mar. 16, 1995.

Morgan et al., "Progress and Properties of High-Power Coherent Vertical Cavity Surface Emitting Laser Arrays", *SPIE*. vol. 1850, Jan. 1993, pp. 100-108.

Morgan et al., "Progress in Planarized Vertical Cavity Surface Emitting Laser Devices and Arrays", *SPIE*. vol. 1562, Jul. 1991, pp. 149-159.

Morgan, et al. "Spatial-Filtered Vertical-Cavity Top Surface-Emitting Lasers", CLEO, 1993, pp. 139-139.

Morgan et al., "Submilliamp, Low-Resistance, Continuous-Wave, Single-Mode GaAs Planar Vertical-Cavity Surface Emitting Lasers", Honeywell Technology Center, Jun. 1995.

Morgan et al., "Transverse Mode Control of Vertical-Cavity Top-Surface Emitting Lasers", *IEEE Photonics Technology Letters*, vol. 4, No. 4, Apr. 1993, pp. 374-377.

Morgan et al., "Vertical-cavity surface-emitting laser arrays", Invited Paper, *SPIE*, vol. 2398, Feb. 6, 1995, pp. 65-93.

Morgan et al., "Vertical-cavity surface-emitting lasers come of age", Invited Paper, *SPIE*, vol. 2683, 0-8194-2057, Mar. 1996, pp. 18-29.

Morgan, "High-Performance, Producible Vertical Cavity Lasers for Optical Interconnects", High Speed Electronics and Systems, vol. 5, No. 4, Dec. 1994, pp. 65-95.

Naone R.L., et al., "Tapered-apertures for high efficiency miniature VCSELs", LEOS newsletter, vol. 13, No. 4 pp. 1-5, Aug. 1999.

Nugent et al., "Self-Pulsations in Vertical-Cavity Surface-Emitting Lasers", *Electronic Letters*, vol. 31, No. 1, Jan. 5, 1995, pp. 43-44.

Oh, T.H. et al., "Single-Mode Operation in Aniguided Vertical-Cavity Surface Emitting Laser Using a Low-Temperature Grown AlGaAs Dielectric Aperture", *IEEE Photon. Technol Lett.*, 10(8), 1064-1066 (1998).

Osinski, et al., "Temperature and Thickness Dependence of Steam Oxidation of AIAs in Cylindrical Mesa Structure," IEEE Photonics Technology Letters, vol. 13, No. 7, pp. 687-689, Jul. 2001.

Peck, D. Stewart, Comprehensive Model for Humidity Testing Correlation, IEEE/IRPS, pp. 44-50, 1986.

Ries, et al., "Visible-spectrum (λ=650nm) photopumped (pulsed, 300 K) laser operation of a vertical-cavity AIAs-AlGaAs/InAlP-InGaP quantum well heterostructure utilizing native oxide mirrors," Applied Physics Letters, vol. 67, No. 8, pp. 1107-1109, Aug. 21, 1995.

S.S. Wang and R. Magnusson, "Multilayer Waveguide-Grating Filters", *Appl. Opt.*, vol. 34, No. 14, pp. 2414-2420, 1995.

S.S. Wang and R. Magnusson, "Theory and Applications of Guided-Mode Resonance Filters", *Appl. Opt.*, vol. 32, No. 14, pp. 2606-2613, 1993.

Sah, et al., "Carrier Generation and Recombination in P-N Junctions and P-N Junction Characteristics," Proceedings of the IRE, pp. 1228-1243, Sep. 1957.

Schubert, "Resonant Cavity Light-Emitting Diode", *Appl. Phys. Lett.*, vol. 60, No. 8, pp. 921-923, Feb. 24, 1992.

Shi, et al., "Photoluminescence study of hydrogenated aluminum oxide-semiconductor interface," Applied Physics Letters, vol. 70, No. 10, pp. 1293-1295, Mar. 10, 1997.

Smith, R.E. et al., Polarization-Sensitive Subwavelength Antireflection Surfaces on a Semiconductor for 975 NM, *Optics Letters*, vol. 21, No. 15, Aug. 1, 1996, pp. 1201-1203.

Spicer, et al., "The Unified Model for Schottky Barrier Formation and MOS Interface States in 3-5 Compounds," Applications of Surface Science, vol. 9, pp. 83-01, 1981.

Suning Tang et al., "Design Limitations of Highly Parallel Free-Space Optical Interconnects Based on Arrays of Vertical Cavity Surface-Emitting Laser Diodes, Microlenses, and Photodetectors", Journal of Lightwave Technology, vol. 12, No. 11, Nov. 1, 1994, pp. 1971-1975.

T. Mukaihara, "Polarization Control of Vertical-cavity Surface Emitting Lasers by a Birefringent Metal/Semiconductor Polarizer Terminating a Distributed Bragg Reflector," Tokyo Institute of Technology, Precision and Intelligence Laboratory, pp. 183-184.

Tao, Andrea, "Wet-Oxidation of Digitally Alloyed AlGaAs," National Nanofabrication Users Network, Research Experience for Undergraduates 2000, 2 pages.

Tatum, et al., Commercialization of Honeywell's VCSEL Technology, Published in Proceedings for the SPIE, vol. 3946, SPI, 2000, 12 pages.

Tshikazu Mukaihara, et al., "A Novel Birefringent Distributed Bragg Reflector Using a Metal/Dielectric Polarizer for Polarization Control of Surface-Emitting Lasers," Japan J. Appl. Phys. vol. 33 (1994) pp. L227-L229, Part 2, No. 2B, Feb. 15, 1994.

Tu, Lie-Wei et al., "Transparent conductive metal-oxide contacts in vertical-injection top-emitting quantum well lasers", Appl. Phys. Lett 58 (8) Feb. 25, 1991, pp. 790-792.

Wieder, H.H., "Fermi level and surface barrier of $Ga_xIn_{1-x}As$ alloys," Applied Physics Letters, vol. 38, No. 3, pp. 170-171, Feb. 1, 1981.

Wipiejeewski, et al., "VCSELs for datacom applications," Invited Paper, Part of the SPIE Conference on Vertical-Cavity Surfac-Emitting Lasers III, San Jose, California, SPIE vol. 3627, pp. 14-22, Jan. 1999.

Y.M. Yang et al., "Ultralow Threshold Current Vertical Cavity Surface Emitting Lasers Obtained with Selective Oxidation", *Elect. Lett.*, vol. 31, No. 11, pp. 886-888, May 25, 1995.

Yablonovitch et al., "Photonic Bandgap Structures", *J. Opt. Soc. Am. B.*, vol. 10, No. 2, pp. 283-295, Feb. 1993.

Young et al., "Enhanced Performance of Offset-Gain High Barrier Vertical-Cavity Surface-Emitting Lasers", *IEEE J. Quantum Electron.*, vol. 29, No. 6, pp. 2013-2022, Jun. 1993.

U.S. Appl. No. 09/751,422, Filed Dec. 29, 2000, entitled "Resonant Reflector for Use with Optoelectronic Devices".

U.S. Appl. No. 09/751,423, filed Dec. 29, 2000, entitled "Spatially Modulated Reflector for an Optoelectronic Device".

Athale, et al., "Incoherent optical image processing with acousto-optic pupil-plane filtering", Applied Optics, vol. 34, No. 2, pp. 276-280, Jan. 10, 1995.

Bowers et al., "Fused Vertical Cavity Lasers With Oxide Aperture", Final report for MICRO project 96-042, Industrial Sponsor: Hewlett Packard, 4 pages, 1996-97.

Catchmark et al., "High Temperature CW Operation of Vertical Cavity Top Surface-Emitting Lasers", CLEO 1993, p. 138.

Chemla et al., "Nonlinear Optical Properties of Semiconductor Quantum Wells", *Optical Nonlinearities and Instabilities in Semiconductors*, Academic Press, Inc., Copyright 1988, pp. 83-120.

Choe, et al., "Lateral oxidation of AIAs layers at elevated water vapour pressure using a closed-chamber system," Letter to the Editor, Semiconductor Science Technology, 15, pp. L35-L38, Aug. 2000.

Choa et al., "High-Speed Modulation of Vertical-Cavity Surface-Emitting Lasers", IEEE Photonics Technology Letter, vol. 3, No. 8, Aug. 1991, pp. 697-699.

Choquette et al., "High Single Mode Operation from Hybrid Ion Implanted/Selectively Oxidized VCSELs", 200 IEEE 17th International Semiconductor Laser Conference, Monterrey, CA pp. 59-60.

Choquette et al., "Lithographically-Defined Gain Apertures Within Selectively Oxidized VCSELs", paper CtuL6, Conference on Lasers and Electro-Optics, San Francisco, California (2000).

Choquette, et al., "VCSELs in information systems: 10Gbps$^{-1}$ oxide VCSELs for data communication", Optics In Information Systems, vol. 12, No. 1, p. 5, SPIE International Technical Group Newsletter, Apr. 2001.

Chua, et al., "Low-Threshold 1.57-μm VC-SEL's Using Strain-Compensated Quantum Wells and Oxide/Metal Backmirror," IEEE Photonics Technology Letters, vol. 7, No. 5, pp. 444-446, May 1995.

Chua, et al., "Planar Laterally Oxidized Vertical-Cavity Lasers for Low-Threshold High-Density Top-Surface-Emitting Arrays," IEEE Photonics Technology Letters, vol. 9, No. 8, pp. 1060-1062, Aug. 1997.

Cox, J. A., et al., "Guided Mode Grating Resonant Filters for VCSEL Applications", *Proceedings of the SPIE*, The International Society for Optical Engineering, Diffractive and Holographic Device Technologies and Applications V, San Jose, California, Jan. 28-29, 1998, vol. 3291, pp. 70-71.

Farrier, Robert G., "Parametric control for wafer fabrication: New CIM techniques for data analysis," Solid State Technology, pp. 99-105, Sep. 1997.

Fushimi, et al., "Degradation Mechanism in Carbon-doped GaAs Minority-carrier Injection Devices," 34th Annual IRPS Proceedings, Dallas, TX., Apr. 29-May 2, 1996, 8 pages.

G. G. Ortiz, et al., "Monolithic Integration of In0.2 GA0.8As Vertical Cavity Surface-Emitting Lasers with Resonance-Enhanced Quantum Well Photodetectors", *Electronics Letters*, vol. 32, No. 13, Jun. 20, 1996, pp. 1205-1207.

G. Shtengel et al., "High-Speed Vertical-Cavity Surface-Emitting Lasers", *Photon. Tech. Lett.*, vol. 5, No. 12, pp. 1359-1361 (Dec. 1993).

Geib, et al., "Comparison of Fabrication Approaches for Selectively Oxidized VCSEL Arrays," Proceedings of SPIE, vol. 3946, pp. 36-40, 2000.

Graf, Rudolph, *Modern Dictionary of Electronics*, 6th ed., Indiana: Howard W. Sams & Company, 1984, p. 694.

Guenter et al., "Reliability of Proton-Implanted VCSELs for Data Communications", Invited paper, SPIE, vol. 2683, OE LASE 96; Photonics West: Fabrication, Testing and Reliability of Semiconductor Lasers, (SPIE, Bellingham, WA 1996).

Guenter, et al., "Commercialization of Honeywell's VCSEL technology: further developments," Proceedings of the SPIE, vol. 4286, GSPIE 2000, 14 pages.

Hadley et al., "High-Power Single Mode Operation from Hybrid Ion Implanted/Selectively Oxidized VCSELs", 13th Annual Meeting IEEE Lasers and Electro-Optics Society 2000 Annual Meeting (LEOS 2000), Rio Grande, Puerto Rico, pp. 804-805.

Hawthorne, et al., "Reliability Study of 850nm VCSELs for Data Communications," IEEE, pp. 1-11, May 1996.

Herrick, et al., "Highly reliable oxide VCSELs manufactured at HP/Agilent Technologies," Invited Paper, Proceedings of SPIE vol. 3946, pp. 14-19, 2000.

Hibbs-Brenner et al., "Performance, Uniformity and Yield of 850nm VCSELs Deposited by MOVPE", *IEEE Phot. Tech. Lett.*, vol. 8, No. 1, pp. 7-9, Jan. 1996.

Hideaki Saito, et al., "Controlling polarization of quantum-dot surface-emitting lasers by using structurally anisotropic self-assembled quantum dots," American Institute of Physics, Appl, Phys. Lett. 71 (5), pp. 590-592, Aug. 4, 1997.

Hornak et al., "Low-Termperature (10K-300K) Characterization of MOVPE-Grown Vertical-Cavity Surface-Emitting Lasers", *Photon. Tech. Lett.*, vol. 7, No. 10, pp. 1110-1112, Oct. 1995.

Huffaker et al., "Lasing Characteristics of Low Threshold Microcavity Layers Using Half-Wave Spacer Layers and Lateral Index Confinement", *Appl. Phys. Lett.*, vol. 66, No. 14, pp. 1723-1725, Apr. 3, 1995.

Jewell et al., "Surface Emitting Microlasers for Photonic Switching & Intership Connections", *Optical Engineering*, vol. 29, No. 3, pp. 210-214, Mar. 1990.

Jiang et al., "High-Frequency Polarization Self-Modulation in Vertical-Cavity Surface-Emitting Lasers", *Appl. Phys. Letters*, vol. 63, No. 26, Dec. 27, 1993, pp. 2545-2547.

K.L. Lear et al., "Selectively Oxidized Vertical Cavity Surface-Emitting Lasers with 50% Power Conversion Efficiency", *Elec. Lett.*, vol. 31, No. 3 pp. 208-209, Feb. 2, 1995.

Kash, et al., "Recombination in GaAs at the AIAs oxide-GaAs interface," Applied Physics Letters, vol. 67, No. 14, pp. 2022-2024, Oct. 2, 1995.

Kishino et al., "Resonant Cavity-Enhanced (RCE) Photodetectors", *IEEE Journal of Quantum Electronics*, vol. 27, No. 8, pp. 2025-2034.

Koley B., et al., "Dependence of lateral oxidation rate on thickness of AIAs layer of interest as a current aperture in vertical-cavity surface-emitting laser structures", Journal of Applied Physics, vol. 84, No. 1, pp. 600-605, Jul. 1, 1998.

Kuchibhotla et al., "Low-Voltage High Gain Resonant_Cavity Avalanche Photodiode", *IEEE Photonics Technology Letters*, vol. 3, No. 4, pp. 354-356.

Lai et al., "Design of a Tunable GaAs/AiGaAs Multiple-Quantum-Well Resonant Cavity Photodetector", *IEEE Journal of Quantum Electronics*, vol. 30, No. 1, pp. 108-114.

Lee et al., "Top-Surface Emitting GaAs Four-Quantum-Well Lasers Emitting at 0-85 um", *Electronics Letters*, vol. 24, No. 11, May 24, 1990, pp. 710-711.

Lehman et al., "High Frequency Modulation Characteristics of Hybrid Dielectric/AlGaAs Mirror Singlemode VCSELs", *Electronic Letters*, vol. 31, No. 15, Jul. 20, 1995, pp. 1251-1252.

Maeda, et al., "Enhanced Glide of Dislocations in GaAs Single Crystals by Electron Beam Irradiation," Japanese Journal of Applied Physics, vol. 20, No. 3, pp. L165-L168, Mar. 1981.

Magnusson, "Integration of Guided-Mode Resonance Filters and VCSELs", Electo-Optics Research Center, Department of Electrical Engineering, University of Texas at Arlington, May 6, 1997.

Martinsson et al., "Transverse Mode Selection in Large-Area Oxide-Confined Vertical-Cavity Surface-Emitting Lasers Using a Shallow Surface Relief", *IEEE Photon. Technol. Lett.*, 11(12), 1536-1538 (1999).

Miller et al., "Optical Bistability Due to Increasing Absorption", *Optics Letters*, vol. 9, No. 5, May 1984, pp. 162-164.

Min Soo Park and Byung Tae Ahn, "Polarization control of vertical-cavity surface-emitting lasers by electro-optic birefringence," Applied Physics Letter, vol. 76, No. 7, pp. 813-815, Feb. 14, 2000.

Morgan et al., "200 C, 96-nm Wavelength Range, Continuous-Wave Lasing from Unbonded GaAs MOVPE-Grown Vertical Cavity Surface-Emitting Lasers", *IEEE Photonics Technology Letters*, vol. 7, No. 5, May 1995, pp. 441-443.

Morgan et al., "High-Power Coherently Coupled 8×8 Vertical Cavity Surface Emitting Laser Array", *Appl. Phys Letters*, vol. 61, No. 10, Sep. 7, 1992, pp. 1160-1162.

Morgan et al., "Hybrid Dielectric/AlGaAs Mirror Spatially Filtered Vertical Cavity Top-Surface Emitting Laser", *Appl. Phys. Letters*, vol. 66, No. 10, Mar. 6, 1995, pp. 1157-1159.

Morgan et al., "Novel Hibrid-DBR Single-Mode Controlled GaAs Top-Emitting VCSEL with Record Low Voltage", 2 pages, dated prior to Dec. 29, 2000.

Morgan et al., "One Watt Vertical Cavity Surface Emitting Laser", *Electron. Lett.*, vol. 29, No. 2, pp. 206-207, Jan. 21, 1993.

Morgan et al., "Producible GaAs-based MOVPE-Grown Vertical-Cavity Top-Surface Emitting Lasers with Record Performance", *Elec. Lett.*, vol. 31, No. 6, pp. 462-464, Mar. 16, 1995.

Morgan et al., "Progress and Properties of High-Power Coherent Vertical Cavity Surface Emitting Laser Arrays", *SPIE*, Vo. 1850, Jan. 1993, pp. 100-108.

Morgan et al., "Progress in Planarized Vertical Cavity Surface Emitting Laser Devices and Arrays", *SPIE*, vol. 1562, Jul. 1991, pp. 149-159.

Morgan et al., "Spatial-Filtered Vertical-Cavity Top Surface-Emitting Lasers", CLEO, 1993, pp. 138-139.

Morgan et al., "Submilliamp, Low-Resistance, Continuous-Wave, Single-Mode GaAs Planar Vertical-Cavity Surface Emitting Lasers", Honeywell Technology Center, Jun. 6, 1995.

Morgan et al., "Transverse Mode Control of Vertical-Cavity Top-Surface Emitting Lasers", *IEEE Photonics Technology Letters*, vol. 4, No. 4, Apr. 1993, pp. 374-377.

Morgan et al., "Vertical-cavity surface-emitting laser arrays", Invited Paper, *SPIE*, vol. 2398, Feb. 6, 1995, pp. 65-93.

Morgan et al., Vertical-cavity surface emitting lasers come of age, Invited paper, *SPIE*, vol. 2683, 0-8194-2057, Mar. 1996, pp. 18-29.

Morgan, "High-Performance, Producible Vertical Cavity Lasers for Optical Interconnects", *High Speed Electronics and Systems*, vol. 5, No. 4, Dec. 1994, pp. 65-95.

Naone R.L., et al., "Tapered-apertures for high-efficiency miniature VCSELs", LEOS newsletter, vol. 13, No. 4, pp. 1-5, Aug. 1999.

Nugent et al., "Self-Pulsations in Vertical-Cavity Surface-Emitting Lasers", *Electronic Letters*, vol. 31, No. 1, Jan. 5, 1995, pp. 43-44.

Oh, T. H. et al., "Single-Mode Operation in Antiguided Vertical-Cavity Surface-Emitting Laser Using a Low-Temperature Grown AlGaAs Dielectric Aperture", *IEEE Photon. Technol. Lett*, 10(8), 1064-1066 (1998).

Osinski, et al., "Temperature and Thickness Dependence of Steam Oxidation of AIAs in Cylindrical Mesa Structure," IEEE Photonics Technology Letters, vol. 13, No. 7, pp. 687-689, Jul. 2001.

Peck, D. Stewart, Comprehensive Model for Humidity Testing Correlation, IEEE/IRPS, pp. 44-50; 1986.

Ries, et al., "Visible-spectrum ($\lambda$ =650nm) photopumped (pulsed, 300 K) laser operation of a vertical-cavity AIAs-AlGaAs/InAIP-InGaP quantum well heterostructure utilizing native oxide mirrors," Applied Physics Letters, vol. 67, No. 8, pp. 1107-1109, Aug. 21, 1995.

S.S. Wang and R. Magnusson, "Multilayer Waveguide-Grating Filters", *Appl. Opt.*, vol. 34, No. 14, pp. 2414-2420, 1995.

S.S. Wang and R. Magnusson, "Theory and Applications of Guided-Mode Resonance Filters", *Appl. Opt.*, vol. 32, No. 14, pp. 2606-2613, 1993.

Sah, et al., "Carrier Generation and Recombination in *P-N* Junctions and *P-N* Junction Characteristics," Proceedings of the IRE, pp. 1228-1243, Sep. 1957.

Schubert, "Resonant Cavity Light-Emitting Diode", *Appl. Phys. Lett.*, vol. 60, No. 8, pp. 921-923, Feb. 24, 1992.

Shi, et al., "Photoluminescence study of hydrogenated aluminum oxide-semiconductor interface," Applied Physics Letters, vol. 70, No. 10, pp. 1293-1295, Mar. 10, 1997.

Smith, R.E. et al., Polarization-Sensitive Subwavelength Antireflection Surfaces on a Semiconductor for 975 NM, *Optics Letters*, vol. 21, No. 15, Aug. 1, 1996, pp. 1201-1203.

Spicer, et al., "The Unified Model For Schottky Barrier Formation and MOS Interface States in 3-5 Compounds," Applications of Surface Science, vol. 9, pp. 83-01, 1981.

Suning Tang et al., "Design Limitations of Highly Parallel Free-Space Optical Interconnects Based on Arrays of Vertical Cavity Surface-Emitting Laser Diodes, Microlenses, and Photodetectors", Journal of Lightwave Technology, vol. 12, No. 11, Nov. 1, 1994, pp. 1971-1975.

T. Mukaihara, "Polarization Control of Vertical-cavity Surface-Emitting Lasers by a Birefringent Metal/Semiconductor Polarizer Terminating a Distributed Bragg Reflector," Tokyo Institute of Technology, Precision and Intelligence Laboratory, pp. 183-184.

Tao, Andrea, "Wet-Oxidation of Digitally Alloyed AlGaAs," National Nanofabrication Users Network, Research Experience for Undergraduates 2000, 2 pages.

Tautm, et al., Commerialization of Honeywell's VCSEL Technology, Published in Proceedings fo the SPIE, vol. 3946, SPI, 2000, 12 pages.

Tshikazu Mukaihara, et al., "A Novel Birefringent Distributed Bragg Reflector Using a Metal/Dielectric Polarizer for Polarization Control of Surface-Emitting Lasers," Japan J. Appl. Phys. vol. 33 (1994) pp. L227-L229, Part 2, No. 2B, Feb. 15, 1994.

Tu, Li-Wei et al., "Transparent conductive metal-oxide contacts in vertical-injection top-emitting quantum well lasers", Appl. Phys. Lett. 58 (8) Feb. 25, 1991, pp. 790-792.

Wieder, H.H., "Fermi level and surface barrier of $Ga_xIn_{1-x}As$ alloys," Applied Physics Letters, vol. 38, No. 3, pp. 170-171, Feb. 1, 1981.

Wipiejewski, et al., "VCSELs for datacom applications," Invited Paper, Part of the SPIE Conference on Vertical-Cavity Surface-Emitting Lasers III, San Jose, California, SPIE vol. 3627, pp. 14-22, Jan. 1999.

Y. M. Yang et al., "Ultralow Threshold Current Vertical Cavity Surface Emitting Lasers Obtained with Selective Oxidation", *Elect. Lett.*, vol. 31, No. 11, pp. 886-888, May 25, 1995.

Yablonovitch et al., "Photonic Bandgap Structures", *J. Opt. Soc. Am. B.*, vol. 10, No. 2, pp. 283-295, Feb. 1993.

Young et al., "Enhanced Performance of Offset-Gain High Barrier Vertical-Cavity Surface-Emitting Lasers", *IEEE J. Quantum Electron.*, vol. 29, No. 6, pp. 2013-2022, Jun. 1993.

U.S. Appl. No. 09/751,422, filed Dec. 29, 2000, entitled "Resonant Reflector for Use with Optoelectronic Devices".

U.S. Appl. No. 09/751,423, filed Dec. 29, 2000, entitled "Spatially Modulated Reflector for an Optoelectronic Device".

Athale, et al., "Incoherent optical image processing with acousto-optic pupil-plane filtering", Applied Optics, vol. 34, No. 2, pp. 276-280, Jan. 10, 1995.

\* cited by examiner

METHODS FOR SIGNAL TRANSMISSION IN OPTICAL FIBER

RELATED APPLICATIONS

This application is a divisional, and claims the benefit, of U.S. patent application Ser. No. 10/610,256, entitled HIGH SPEED OPTICAL SYSTEM, filed Jun. 30, 2003 now U.S. Pat. No. 6,961,489, and incorporated herein in its entirety by this reference.

BACKGROUND

The present invention pertains to optical transmission of signals and more particularly to high speed light signal transmission in optical fibers.

Achieving a high gigahertz bit per second data rate in an optical fiber system is difficult and requires careful control of intensity distribution of light signals at the input face of the optical fiber in the system.

BRIEF SUMMARY OF AN EXEMPLARY EMBODIMENT OF THE INVENTION

In general, exemplary embodiments of the invention are concerned with methods for transmitting a signal in an optical system. In one example, the method begins when an optical signal is generated. Then, the optical signal is manipulated such that the optical signal defines a substantially annular intensity profile, where power of the optical signal varies in the intensity profile. Finally, the optical signal is launched into an input face of an optical fiber such that a predetermined part of the intensity profile of the optical signal is located proximate an optical axis associated with the optical fiber.

DETAILED DESCRIPTION OF EXEMPLARY EMBODIMENTS OF THE INVENTION

Figure 1:
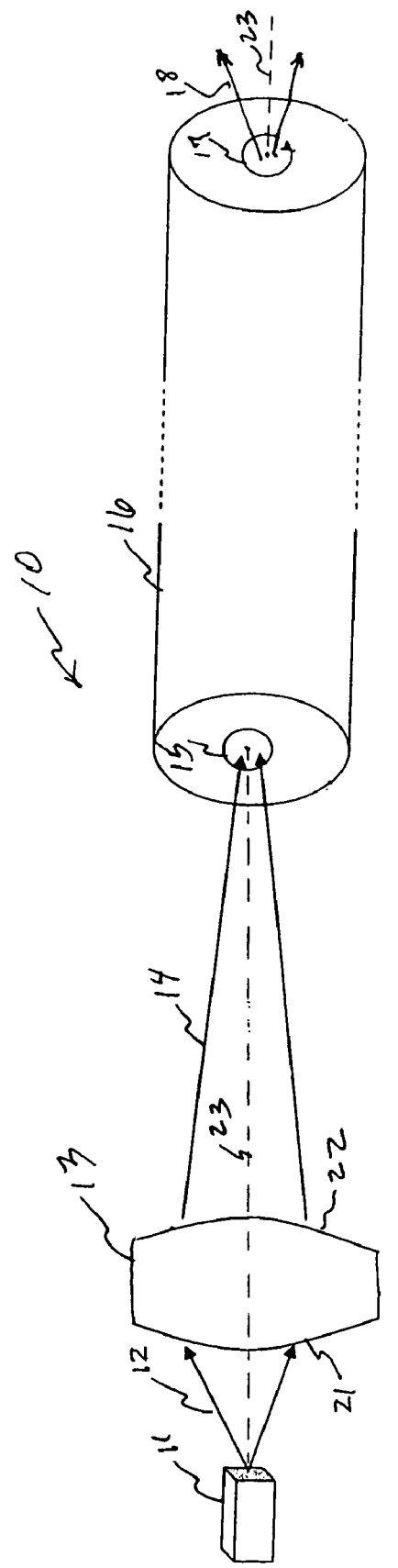
FIG. 1 is a diagram of a high speed optical system.

FIG. 1 shows a layout of an optical system 10 for coupling light signals at very high rates. A laser light source 11, such as a vertical cavity surface emitting laser (VCSEL) may emit light signals 12 which go through a transfer optical element 13. From optical element 13, light rays 14 may impinge on a core or face 15 of an optical fiber 16 which may be a multimode fiber. Rays 14 may propagate through fiber 16 and exit fiber 16 at core or face 17 as light rays or signals 18. The light rays or signals 12 may be conditioned into light rays or signals 14 to make high speed transmission through optical fiber 16 or other like medium possible.

Achieving, for instance, a ten gigahertz bit per second data rate in fiber 16 with an approximately 2000 megahertz kilometer bandwidth may require careful control of the intensity distribution of light 14 at fiber face 15, i.e., a launch condition. An industry specification specifies a power distribution at the output fiber face sufficient to achieve a 2000 MHz-Km bandwidth-distance product in a 500 MHz-Km GI fiber. The Telecommunications Industry Association (TIA)/Electronic Industries Alliance (EIA)-492AAAB specification (hereafter "TIA specification") effectively says that a 2000 MHz-Km bandwidth at 850 nm through 50/125-micron graded index multimode fiber can be achieved if at the end of the fiber the encircled flux within a radius of 4.5 microns is less than or equal to 30 percent of the total and the encircled flux within a radius of 19 microns is equal to or greater than 86 percent of the total encircled flux. An example of the fiber may be Corning's standard 50/125 multimode fiber which has a core radius of 25 microns and a cladding radius of 75 microns. The core and cladding indexes of refraction are 1.4948 and 1.4800, respectively. The wavelength is 850 nm.

Various illustrative examples of the present invention may provide the appropriate distribution of power into fiber 16 to achieve the data rate performance of a 10 gigahertz bit per second operation at 850 nm that is compliant with the above-noted TIA specification. The power of light source 11 may be redistributed by optical element 13 from the center to the outskirts of the beam which is projected on to core 15 of fiber 16. The velocities of the various modes of light are more diverse closer to the center of core 15 than the velocities of the modes of light closer to the perimeter of core 15. Since the velocities of the modes of light near the circumference of core 15 are close together, a light pulse having its flux or power concentrated more towards the perimeter will come through fiber 16 tighter and more distinguished in shape. This closeness of velocities of the various modes makes possible for very high rates of data transmission. That is at least one reason for the outer concentration of the power of light signals in core 15.

Figure 2:
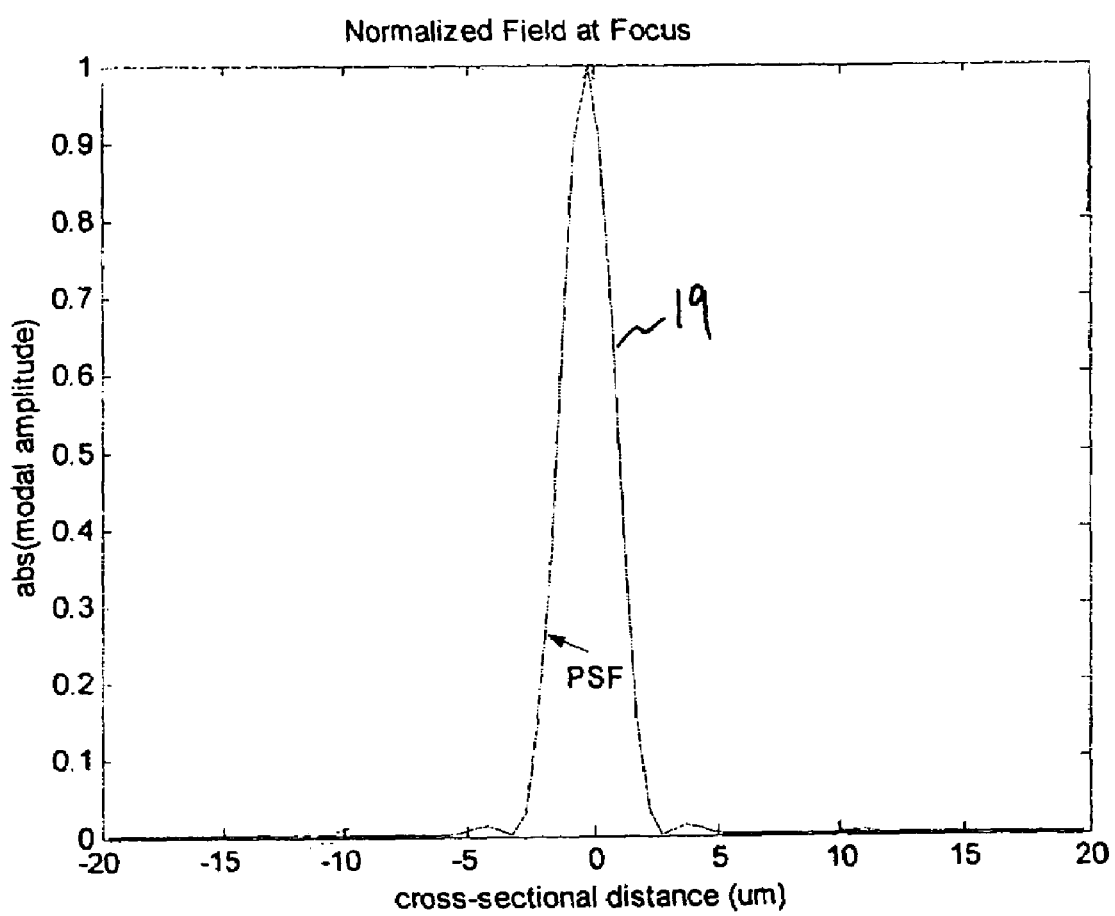
FIG. 2 is a graph of an intensity distribution curve of a corrected optic projecting effectively a point source of light.
Figure 3:
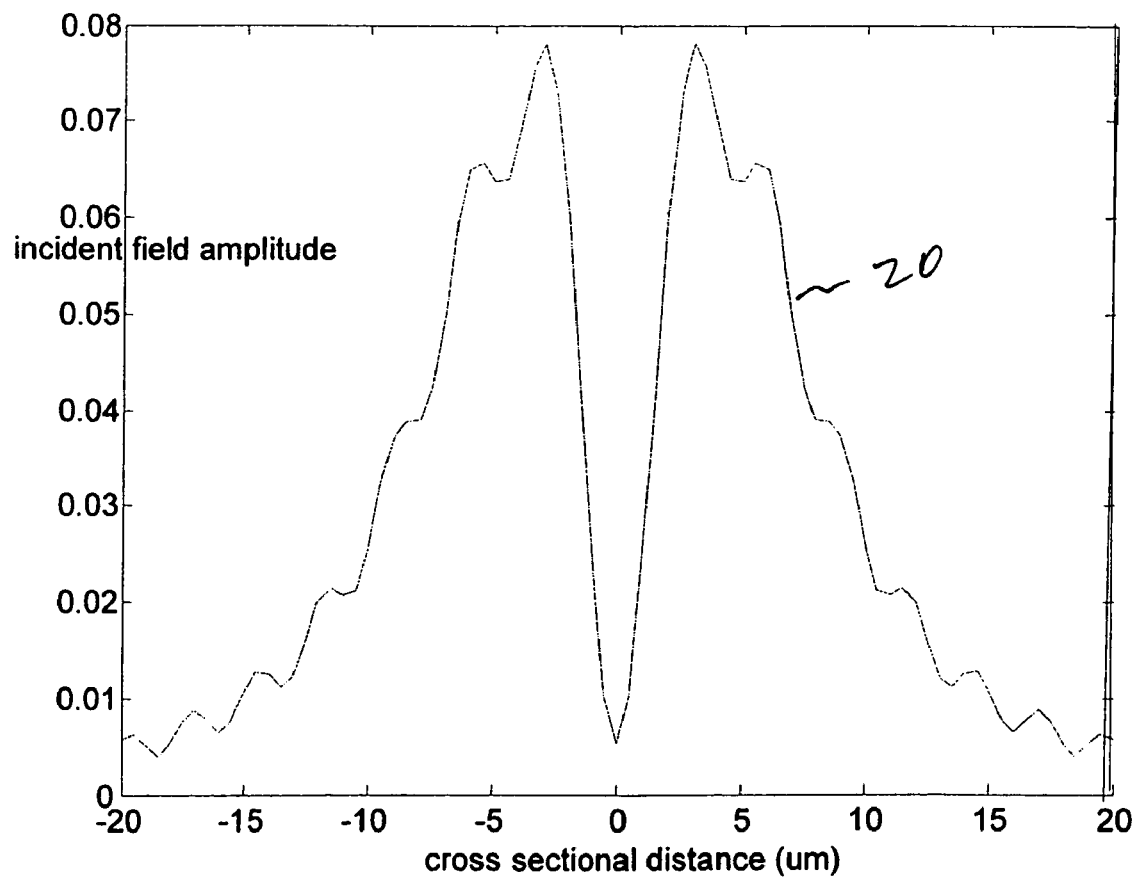
FIG. 3 is a graph of an intensity distribution of an annular projection of light.

Attaining a power distribution of light on the end face core 15 of fiber 16 may be tried with a conventional, well-corrected, aspheric transfer optics as an optical element 13 that is adjusted to the best focus. This kind of optics may not be sufficient because compliance with the TIA specification could be achieved only for a few special modes, such as mode 2, 1 of a VCSEL as a light source 11. Robust compliance for a wide range of modes, for instance, of a VCSEL, and with tolerance of lateral and axial misalignment of the projected light from the optical element to core 15 may be attained with an optical element 16 whose point-source distribution function or point spread function (PSF) at the fiber face of core 15 complies with the TIA specification. PSF refers to a distribution of light on the fiber core face from a point source. The point source may radiate light in a spherical manner but only a cone of the light is captured by the optical element. The outgoing light from the optical element may be converged to a point, for example, with a lens. However, the reality is that the light source is not actually a point, and that diffraction and aberration, among other imperfections, prevent the light from being focused as a point on the fiber face. Even if the source were a point, the diffraction and aberration of the transfer optics or optical element 16 would prevent the projection of a point of light on the fiber 16 end face. A well corrected optic would have distribution curve 19, as shown in FIG. 2, on the fiber 16 end face. However, curve 19 does not comply with the TIA specification needed to achieve the 10 gigahertz bit per second data rate in the 2000 MHz-Km multimode fiber using 850 nm light. In order to get the power or flux distribution needed by the specification, one may maintain an annular intensity profile on the fiber face after convolving the PSF with the finite light source aperture, apodizing the complex source model amplitude, and including optical magnification. FIG. 3 illustrates an example of an annular intensity profile 20 on a face of core 15 of fiber 16. The normalized incident field amplitude or intensity of light is shown on the ordinate axis and the cross-sectional distance in microns from the center of the core 17 face of fiber 16 for each amplitude is shown by the abscissa axis.

Figure 4:
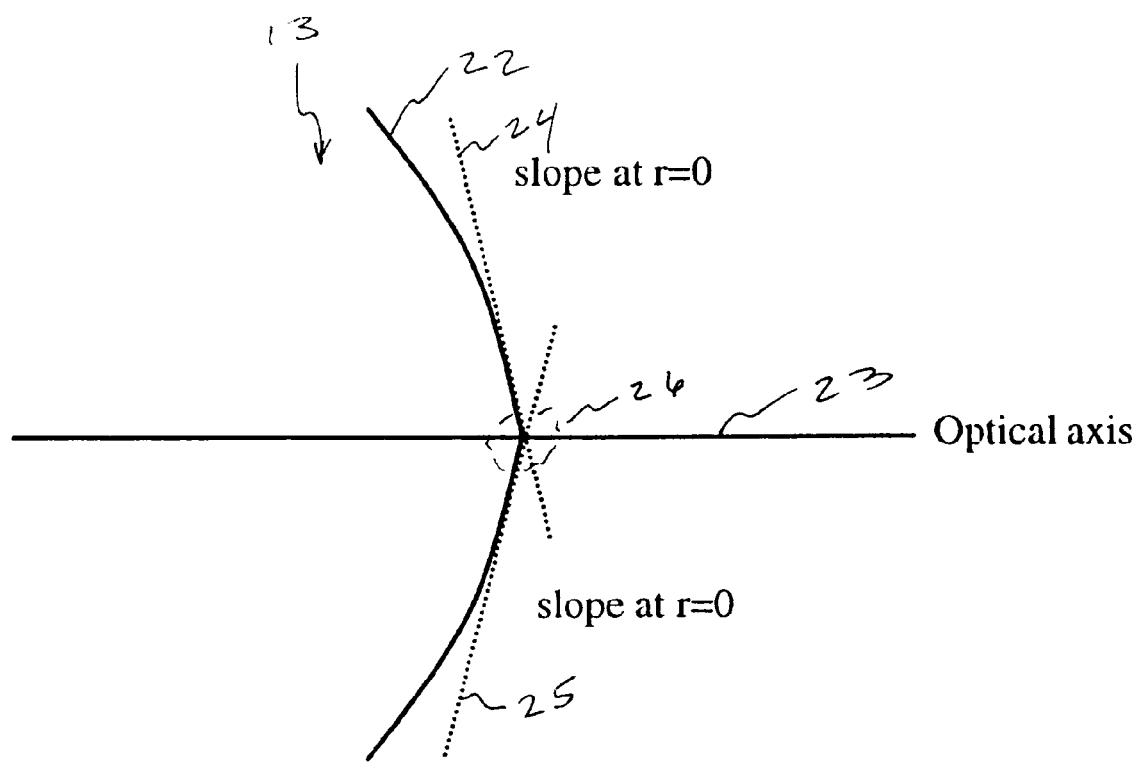
FIGS. 4 and 5 show cross-sectionals of lenses having slope discontinuities.
Figure 5:
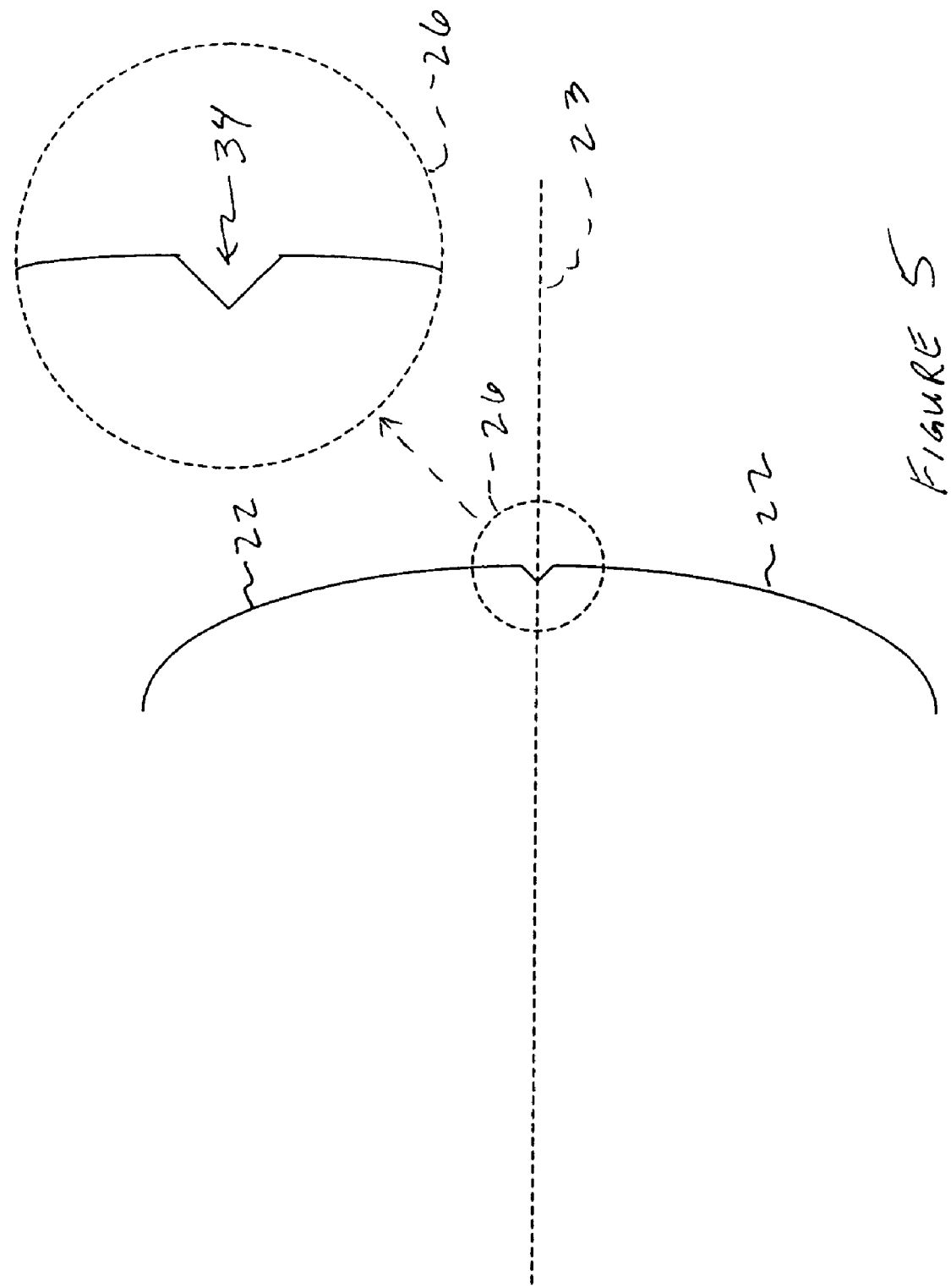

Two characteristics of optical element 16, taken singly or in combination, may produce the light launch profile on fiber face core 15 and maintain robust compliance with the encircled flux conditions of the TIA specification. First, one surface 21 or 22 of optical element 13 may have a slope discontinuity at an optical axis 23 (r=0; r being the distance radially or perpendicularly from the optical axis, from the optical axis). This characteristic provides an axicon function to optical element 13. The optical prescription for surface 22, for example, may be a surface of revolution about optical axis 23. This functionality may be implemented by including it in the surface prescription having an odd power of radius. An axicon function or lens may be used to convert a parallel laser beam into a ring, a doughnut shaped ablation or an annular intensity profile 20 shown in FIG. 3. A surface 22 discontinuity may put into effect the axicon function, phenomenon or lens to produce the annular intensity profile 20 on the face of fiber 16. An illustration of surface 22 having a slope discontinuity at optical axis 23 is shown in FIG. 4. Line 24 shows the slope of the upper part of surface 22 at optical axis 23 (r=0). Line 25 shows the slope of the lower part of surface 22 at optical axis 23. As one follows surface 22 across axis 23, there is a disruptive change of slope from slope 24 to slope 25. Slope discontinuities may be implemented in various ways. FIG. 5 shows a slope or curvature discontinuity 34 as a small notch-like shape, cusp, indentation or protrusion in surface 22 at area 26 about optical axis 23. Discontinuity 34 may be sharp, abrupt, rough or smooth. Discontinuity 34 may be of any shape or contour. Elsewhere, the slope may be continuous, such as a function of the distance from optical axis 23 or of the radius, except at optical axis 23. Discontinuity 34 of slope of surface 23 may appear imperceptible to the eye. Apart from point or area 26, surface 22 may aspherical or spherical. Surface 21 of optical element 13 may instead have the slope discontinuity.

An illustrative example of lens surface specifications for optic element 13 may be in the following formulas, constants and variables for each of the surfaces. Surface 1 may be surface 21 and surface 2 may be surface 22 in FIG. 1, or vice versa.

Surface 1

$$z=\{cr^2/[1+(1-(1+k)c^2r^2)^{1/2}]\}+A_1r^1+A_2r^2+A_4r^4+A_6r^6$$

$c=1/R;\ R=0.65943$ mm $k=-1.701593$ $A_1=0$ $A_2=0$ $A_4=0.062933$ $A_6=-0.01539$

Surface 2

$$z=\{cr^2/[1+(1-(1+k)c^2r^2)^{1/2}]\}+A_1r^1+A_2r^2+A_4r^4+A_6r^6$$

$c=1/R;\ R=-2.015644$ mm $k=-5.212050$ $A_1=0.025409$ $A_2=0.012167$ $A_4=0$ $A_6=0$

Figure 6:
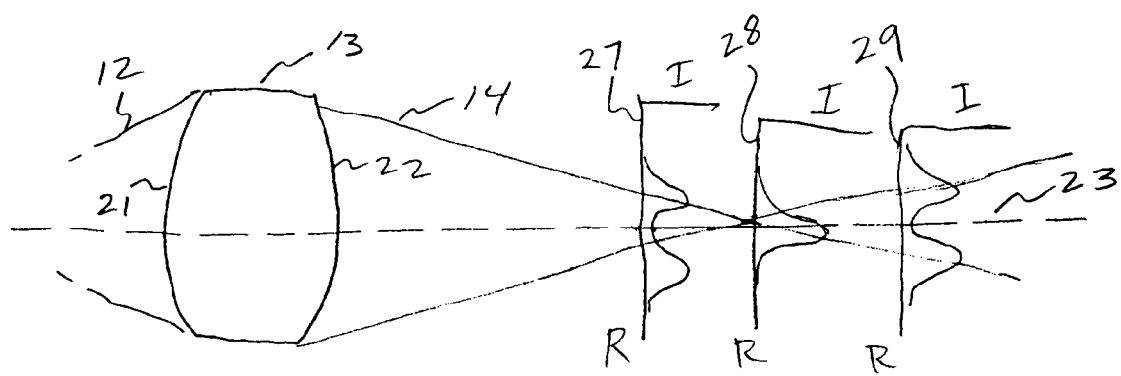
FIG. 6 reveals several focal adjustments of an optical element.

The second characteristic which may be implemented to produce a launch profile having an annular intensity distribution or profile, similar to profile 20 of FIG. 3, is the defocusing of optical element 13 relative to the face of core 15 at a fiber 16 end. This defocusing may result in an intensity profile sufficient to attain compliance with the TIA specification. Optical element 16 is defocused to a region corresponding to approximately $\pm 8\lambda(f/)^2$. This characteristic may result in the annular or ring-like distribution of light intensity. The area of low or no intensity in the center of the ring or annular distribution may be referred to as the dark spot of Arago in a well-corrected optic. FIG. 6 reveals three focus positions of optical element 13. Position 27 shows an annular intensity profile of light 14 launched on fiber 16 face of core 15. The intensity is shown by coordinate I and the distance from optical axis 23 is shown by coordinate R. Position 28 shows a profile having the intensity of light 14 concentrated on optical axis 23. Position 29 shows an annular intensity profile similar to the profile of position 27. Position 28 is a focused place for the core 15 face and positions 27 and 29 are defocused places for the face of core 15 to receive launched light 14. Either position 27 or 29 may be used to achieve the annular distribution of light intensity on the face of core 15.

Figure 7:
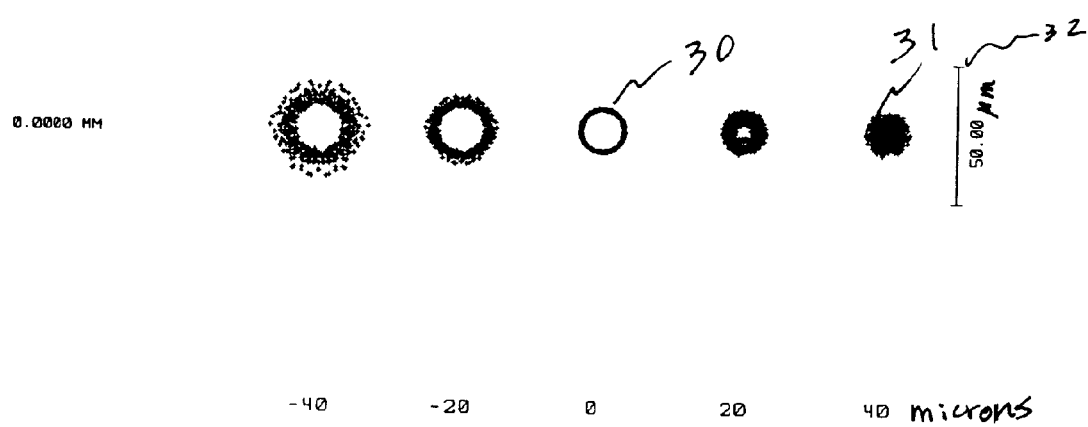
FIG. 7 is a set of spot diagrams of intensity profiles of defocused and focused light.

FIG. 7 reveals an illustrative example of spot diagrams of the intensity profiles as seen on the core 15 end face of fiber 16 to show the defocus characteristic of system 10 for attaining the annular distribution of light intensity so as to comply with the TIA specification. Focus occurs at about 40 microns in FIG. 7 for spot 31. The best annulus at defocus occurs at 0 microns of adjustment for spot 30. Scale 32 shows the size of the intensity concentrations for the spots in the diagram.

Figure 8:
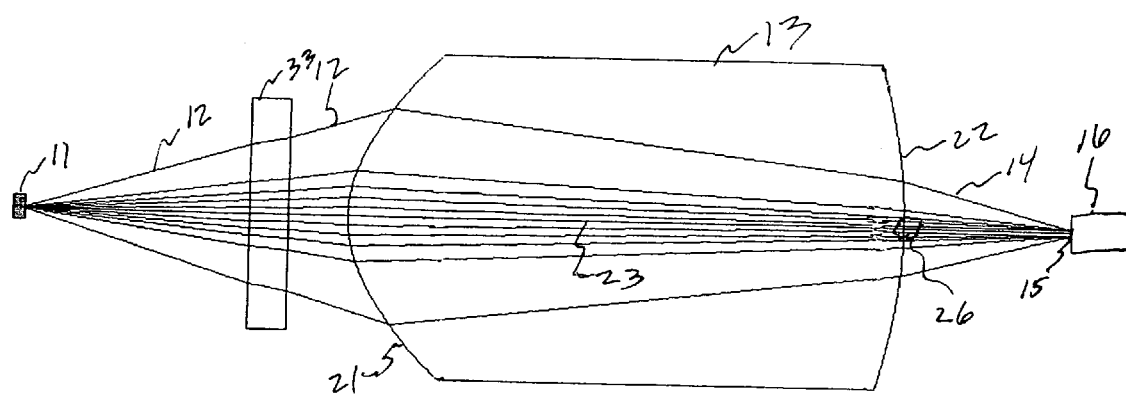
FIG. 8 is a schematic of the optical system having the lens slope discontinuity and defocus features.

Optical system 10 may incorporate both the axicon feature and the annular PSF at defocus, even though either one alone may suffice for attaining compliance with the TIA specification. Incorporating the characteristics or elements is system 10 of FIG. 8. It may be referred to as the "Ringlight" system. Light source 11 may be a VCSEL having about an 8 micron aperture. Between source 11 and optical element 13 is a BK7™ window 33 which may be part of the vacuum sealed package containing the VCSEL. The window is about 0.203 mm thick and its inner surface is about 1.145 mm from the base of the VCSEL. Window 33 is about 0.3 mm from surface 21 of optical element 13. Optical element 13 is about 2.8 mm long and about 1.7 mm in diameter. Surface 21 may have an even asphere curvature and incorporate a slope discontinuity 26 on axis 23. Surface 22 may have a SPS type or odd asphere surface. Lens surface 21 or 22 or both surfaces may include a hyperbolic (collimating) surface for receiving and collimating light originating from light source 11. Also, optical element 13 may be shaped so that light reflected back toward light source 11 is not focused at a location where light 12 is emitted by source 11. Optical element 13 may be one piece and be made or molded from Ultem$^R$ 1010 which is a General Electric Company plastic. Surface 22 may be about 0.85 mm from the face of core 15 of multimode optical fiber 16. VCSEL 11 may emit light signals 12 which propagate through window 33, surface 21 and optical element 13. The signals may exit element 13 as light 14 that may be launched into core 15 of fiber 16.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A method for transmitting a signal in an optical system, the method comprising:

generating an optical signal along an optical axis for transmission through an optical element;

positioning the optical element so that a surface discontinuity is positioned along the optical axis such that the optical signal defines a substantially symmetric intensity profile; and launching the optical signal into an input face of an optical fiber such that a relative minimum of an incident field amplitude of the intensity profile is located proximate an optical axis associated with the optical fiber.

2. The method as recited in claim 1, wherein an axicon function is provided with respect to the optical signal via the surface discontinuity.

3. The method as recited in claim 1, wherein a PSF of the optical signal at the input face of the fiber is TIA/EIA 492AAAB compliant.

4. The method as recited in claim 1, wherein the relative minimum of the incident field amplitude of the intensity profile is located proximate a center of the intensity profile.

5. The method as recited in claim 1, wherein the relative minimum of the incident field amplitude of the intensity profile comprises a dark spot of Arago.

6. The method as recited in claim 1, wherein the intensity profile is substantially symmetric about the relative minimum of the incident field amplitude.

7. The method as recited in claim 1, wherein the intensity profile is substantially annular.

8. A method for transmitting a signal in an optical system, the method comprising:

generating an optical signal;

manipulating the optical signal such that the optical signal defines a substantially annular intensity profile that is substantially symmetric about a relative minimum of an incident field amplitude wherein the step of manipulating includes the steps of:

implementing an axicon function with respect to the optical signal; and defocusing the optical signal such that the portion of the optical signal having a desired substantially annular intensity profile occurs at a predetermined defocused place; and launching the optical signal into a first end of an optical fiber such that the relative minimum of the incident field amplitude is located proximate a center of the first end of the optical fiber.

9. The method as recited in claim 8, wherein the optical signal is transmitted through a multimode optical fiber.

10. The method as recited in claim 8, wherein the optical signal comprises 850 nm laser light.

11. The method as recited in claim 8, wherein the optical signal is capable of supporting a data rate of about 10 Gb/s within the optical fiber.

12. The method as recited in claim 8, further comprising substantially maintaining the substantially annular form of the intensity profile at a second end of the optical fiber.

* * * * *

UNITED STATES PATENT AND TRADEMARK OFFICE
CERTIFICATE OF CORRECTION

PATENT NO. : 7,139,454 B2
APPLICATION NO. : 11/054682
DATED : November 21, 2006
INVENTOR(S) : Cox et al.

It is certified that error appears in the above-identified patent and that said Letters Patent is hereby corrected as shown below:

Column 1
Line 17, change "high gigahertz bit per second data rate" to --high bit per second data rate--

Column 2
Line 1, change "gigahertz bit per second data rate" to --giga bits per second data rate--
Line 24, change "gigahertz bit per second" to --giga bits per second--
Line 67, change "gigahertz bit per" to --giga bits per--

Signed and Sealed this

Thirtieth Day of March, 2010

David J. Kappos
*Director of the United States Patent and Trademark Office*